United States Patent
Reinhardt et al.

(10) Patent No.: US 12,251,895 B2
(45) Date of Patent: Mar. 18, 2025

(54) FIBER COMPOSITE COMPONENT WITH LIGHTING FUNCTION

(71) Applicant: Bayerische Motoren Werke Aktiengesellschaft, Munich (DE)

(72) Inventors: Cornelia Reinhardt, Furth (DE); Mirko Schade, Landshut (DE); Bernhard Zeilmeier, Geisenhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 163 days.

(21) Appl. No.: 18/034,721

(22) PCT Filed: Aug. 27, 2021

(86) PCT No.: PCT/EP2021/073696
§ 371 (c)(1),
(2) Date: May 1, 2023

(87) PCT Pub. No.: WO2022/089810
PCT Pub. Date: May 5, 2022

(65) Prior Publication Data
US 2023/0398753 A1    Dec. 14, 2023

(30) Foreign Application Priority Data
Nov. 2, 2020 (DE) .................... 10 2020 128 723.2

(51) Int. Cl.
*B29C 70/72* (2006.01)
*B29C 70/00* (2006.01)
(Continued)

(52) U.S. Cl.
CPC ............ *B29C 70/72* (2013.01); *B29C 70/003* (2021.05); *B29C 70/16* (2013.01);
(Continued)

(58) Field of Classification Search
None
See application file for complete search history.

(56) References Cited

U.S. PATENT DOCUMENTS

| 11,919,276 B2 | 3/2024 | Newcomb et al. |
| 2004/0079950 A1 | 4/2004 | Takayama et al. |

(Continued)

FOREIGN PATENT DOCUMENTS

| CN | 1492722 A | 4/2004 |
| CN | 102369786 A | 3/2012 |

(Continued)

OTHER PUBLICATIONS

U.S. Notice of Allowance issued in U.S. Appl. No. 18/034,729 dated Jul. 26, 2024 (10 pages).

(Continued)

*Primary Examiner* — Alexander S Thomas
(74) *Attorney, Agent, or Firm* — Crowell & Moring LLP

(57) ABSTRACT

A fiber composite component with a lighting function includes a fiber reinforced unit with at least two fiber layers integrated into a plastics matrix, and an electroluminescent light having a light source arranged between two adjacent fiber layers, the light source including a first insulating layer and a second insulating layer which electrically insulate the light source from the two adjacent fiber layers.

13 Claims, 2 Drawing Sheets

A-A

(51) Int. Cl.
*B29C 70/16* (2006.01)
*B29K 101/10* (2006.01)
*B29K 105/08* (2006.01)
*B29K 105/20* (2006.01)
*B29L 31/30* (2006.01)

(52) U.S. Cl.
CPC ...... *B29K 2101/10* (2013.01); *B29K 2105/08* (2013.01); *B29K 2105/20* (2013.01); *B29L 2031/30* (2013.01); *Y10T 428/22* (2015.01)

(56) References Cited

U.S. PATENT DOCUMENTS

| | | |
|---|---|---|
| 2015/0029743 A1 | 1/2015 | Gneiting et al. |
| 2017/0120810 A1 | 5/2017 | Twork et al. |
| 2018/0162102 A1 | 6/2018 | Stickler et al. |
| 2020/0139595 A1 | 5/2020 | Kim et al. |
| 2020/0247088 A1 | 8/2020 | Murakami et al. |
| 2021/0284063 A1 | 9/2021 | Wang |
| 2021/0300006 A1 | 9/2021 | Piccin et al. |
| 2022/0024377 A1 | 1/2022 | Behrens et al. |

FOREIGN PATENT DOCUMENTS

| | | |
|---|---|---|
| CN | 108839410 A | 11/2018 |
| DE | 101 54 543 A1 | 5/2003 |
| DE | 10 2016 003 812 A1 | 9/2017 |
| DE | 10 2018 212 239 A1 | 1/2020 |
| DE | 10 2018 133 306 A1 | 6/2020 |
| EP | 2 817 199 B1 | 4/2016 |
| EP | 3 335 869 A1 | 6/2018 |
| JP | 2006-123915 A | 5/2006 |
| KR | 10-2005-0043569 A | 5/2005 |
| WO | WO 00/01523 A1 | 1/2000 |

OTHER PUBLICATIONS

International Search Report (PCT/ISA/210) issued in PCT Application No. PCT/EP2021/073696 dated Jan. 12, 2022 with English translation (four (4) pages).
German-language Written Opinion (PCT/ISA/237) issued in PCT Application No. PCT/EP2021/073696 dated Jan. 12, 2022 (five (5) pages).
German-language Search Report issued in German Application No. 10 2020 128 723.2 dated Jan. 14, 2021 with partial English translation (12 pages).
International Search Report (PCT/ISA/210) issued in PCT Application No. PCT/EP2021/073945 dated Jan. 4, 2022 with English translation (four (4) pages).
German-language Written Opinion (PCT/ISA/237) issued in PCT Application No. PCT/EP2021/073945 dated Jan. 4, 2022 (five (5) pages).
German-language Search Report issued in German Application No. 10 2020 128 724.0 dated May 28, 2021 with partial English translation (12 pages).
U.S. Final Office Action issued in U.S. Appl. No. 18/034,729 dated March 29, 2024 (19 pages).
U.S. Non-Final Office Action issued in U.S. Appl. No. 18/034,729 dated Oct. 24, 2023 (12 pages).
English translation of document B2 (DE 10 2018 212 239 A1 filed on May 1, 2023) (16 pages).
Chinese-language Office Action issued in Chinese Application No. 202180062107.7 dated Sep. 11, 2024, with English translation (17 pages).

A-A

FIBER COMPOSITE COMPONENT WITH LIGHTING FUNCTION

BACKGROUND AND SUMMARY OF THE INVENTION

The invention relates to a fiber composite component with a lighting function for a vehicle.

Vehicles have functional lights, for example headlamps or indicators. For reasons of design, there is a desire to be able to also illuminate further components of a vehicle in addition to these functional lights, or to equip them with a lighting function.

Fiber composite components are used both in the interior and in the exterior of vehicles. A fiber composite component has a fiber reinforcement incorporated into a polymer matrix. The fiber reinforcement may take the form, for example, of multiple fiber layers stacked one on top of another. For mass production of the fiber composite components, methods such as resin transfer molding or wet molding, for example, are used.

Document EP 2 817 199 B1 discloses a fiber composite component in which the fiber composite has an at least partial electroluminescent coating which is in contact with electrically conductive fibers in the fiber composite. The electroluminescent coating can be used for illumination in that an electrical power is induced in the electrically conductive fibers. The fiber composite component proposed in document EP 2 817 199 B1 is complex in terms of production. The electroluminescent coating is to be applied to the fiber composite, for example, via screen printing. This entails an additional time-consuming production step in the production of the fiber composite, since the coating has to dry before the fiber composite is processed further. In addition, additional electrically conductive fibers have to be integrated into the fiber composite, and the electrically conductive connection between fibers and coating has to be ensured, which entails a high level of complexity with regard to the exact positioning thereof.

Against this background, it is an object of the invention to specify an improved way of equipping a fiber composite component with a lighting function. In addition, the fiber composite component is to be mass-producible.

The object is achieved by a fiber composite component according to the claimed invention.

A fiber composite component with a lighting function is specified, having a fiber reinforcement comprising at least two fiber layers incorporated into a polymer matrix, and an electroluminescent lamp.

The electroluminescent lamp has a lighting element disposed between the two fiber layers. The lighting element creates the light, which exits therefrom in a two-dimensional manner. The lighting element preferably includes an EL film (electroluminescent film), which is notable for a particularly flat design and has a low space requirement. Such an EL film may, for example, include an electrically conductive film, which is also referred to as front electrode, a back electrode, and an electrically insulating electroluminescent material disposed in between. The front electrode film is transparent, such that the light emitted can exit over the area. The total thickness of the layer stack is typically below one millimeter. The EL film may be cut into virtually any shape, which allows a great deal of freedom with regard to configuration in terms of the lighting effect.

The lighting element of the electroluminescent lamp also has a first and second insulation layer, which electrically insulate the lighting element with respect to the fiber layers.

The insulation layers are preferably inextricably bonded to the above-described layer stack for generation of light, which simplifies the handling of the electroluminescent lamp.

The insulation layers thus constitute the attachment surfaces of the lighting element to the matrix material or the adjacent fiber layers. Such a construction of the lighting element allows the electroluminescent lamp to be integrated into the stack of fiber layers in a particularly simple manner. For example, the electroluminescent lamp may be inserted between two fiber layers and be layered together with the fiber layers to give a stack. The electroluminescent lamp here is more mechanically durable by virtue of the insulation layers on either side and can be more easily handled. The stack thus produced, by contrast with the application of an electroluminescent coating, can be directly processed further and pressed, for example, by the RTM or wet molding method, with the matrix material to give the fiber composite component. It is also possible to use prepregs that are then processed further, for example in an autoclave. The possibility of a particularly thin configuration of the electroluminescent lamp means that the solution proposed has only a low space requirement.

The first insulation layer faces a visible side of the fiber composite component, and the second insulation layer faces away from the visible side. The visible side of the fiber composite component refers to that side which is visible to an observer in the installed state in the vehicle, i.e., for example, the side of the fiber composite component that faces the outside of the vehicle in the case of an exterior component, and the side of the fiber composite component that faces the interior in the case of an interior component.

The first insulation layer preferably takes the form of a color layer. The color layer is used in order to alter the color effect of the electroluminescent lamp in the form of a color filter. For example, the color layer may be configured as a single-color or multicolor translucent layer. The color layer preferably takes the form of a paint layer, especially with a high pigment content in order to create translucence. The use of a color layer makes it possible to achieve a two-color or multicolor lighting effect with just a single lighting element. It has been found that, surprisingly, the color layer simultaneously enables particularly reliable attachment of the lighting element to the polymer matrix.

The second insulation layer preferably takes the form of a polymer layer and may be formed, for example, by a polymer film. However, the integration of a film into a stack of fiber layers may bring challenges with regard to the manufacture of the fiber composite component. Infiltration of the fiber layers must be ensured, and delamination of the component must be prevented. In one configuration, the second insulation layer used is advantageously a PES film (polyether sulfone), bonded to the lighting element by an acrylic adhesive. Experiments have shown that there is no significant delamination between the film and the underlying fiber/matrix composite when such a film is used.

In order to connect the electroluminescent lamp to an electrical field, this may have a contacting section disposed, for example, in an edge region of the component. The edge region may be an outer edge of the component or else be formed by the edge along a cutout in the component, for example an antenna cutout. Contact connection can be effected in the contacting section, for example by way of a plug connection. In one configuration of the invention, a component section of the fiber composite component that surrounds the contacting section is free of reinforcing fibers. For this purpose, the fiber layers in the fiber stack may have a cutout, for example, which is filled completely with matrix material in the production of the component. Such a fiber-free matrix region constitutes an electrical insulation from the environment. The fiber-free component section, after component production, may be processed mechanically, for example, in order to expose the contacting section of the electroluminescent lamp.

By virtue of the integration of the electroluminescent lamp between the fiber layers, the lamp is invisible in the switched-off state. In addition, the overlying fiber layer and the matrix material offer protection from mechanical, chemical and environmental influences.

In one configuration of the invention, it is particularly preferable when the lighting element of the electroluminescent lamp, viewed from a visible side of the fiber composite component, is covered by matrix material and exactly one fiber layer. By virtue of only a single fiber layer being disposed above the lighting element, it is possible to achieve a good light yield and simultaneously to sufficiently cover the electroluminescent lamp in the switched-off state, such that it is virtually invisible in the unlit component.

The fiber reinforcement of the fiber composite component has at least two fiber layers that are stacked one on top of another to give a stack. The stack preferably has more than two fiber layers. The fiber layers may take the form, for example, of a unidirectional scrim, or of a weave, braid, knit, nonwoven or a combination thereof. In order to achieve a particularly uniform and reproducible lighting effect, it is particularly preferable when the visible layer, i.e. the uppermost fiber layer viewed from the visible side of the component, is formed from directed continuous fibers and is, for example, a weave, scrim or braid.

The material of the fiber layers is not limited to a particular material, and it is possible, for example, to use known reinforcing fibers, such as carbon fibers, glass fibers, basalt, aramid or metal fibers, and coated fibers, for example metallized glass fibers, alone or in combination. In particular, the use of an electroluminescent lamp that already has electrical insulation on both sides, in one configuration, makes it possible for individual or all fiber layers, and especially the visible layer, to include electrically conductive fiber materials, for example carbon fibers or metal fibers. This enables a greater degree of freedom in the choice of reinforcing fibers.

If, in one configuration, reinforcing fibers are used in the form of metallized glass fibers, especially for the visible layer, it is possible to increase the light intensity of the component. The metallized glass fibers are coated with a very thin metal layer, for example with metal layers in the range from 10 nm to 100 nm and preferably in the range from 45 nm to 55 nm. For example, the glass fibers may have been subjected to vapor deposition of aluminum. By virtue of the metallization, the glass fibers look opaque under direct light, but remain translucent to transmitted light, such that the lighting from the fiber composite component can pass not just through the fiber gaps but also through the metallized glass fibers themselves.

The fiber reinforcement is incorporated into a polymer matrix. In principle, the polymer matrix may be a thermoset or thermoplastic polymer matrix. For production of components that must meet high mechanical demands, it may be advantageous when the polymer matrix is a thermoset polymer matrix. The polymer matrix is preferably a thermoset polymer matrix. The above-described integration of the electroluminescent lamp into the fiber reinforcement makes it possible to process the fiber stack further together with the lamp in known processes suitable for mass production of fiber composite components, for example the wet molding method or the prepregs method. In particular, the fiber reinforcement can be produced by the RTM (resin transfer molding) method, which enables inexpensive production with high component quality and reproducibility even in mass production. In the RTM method, the fiber stack is inserted into the cavity of a shaping mold. The polymer matrix is injected into the closed shaping mold, infiltrates the fiber reinforcement, and cures under pressure and at elevated temperature.

In order to achieve special lighting effects or to increase the light intensity of the fiber composite component, it is particularly advantageous in one configuration when the polymer matrix is transparent. The light can then exit particularly effectively from the fiber composite component through the interstices between the fibers that are filled with matrix material.

The fiber composite component may preferably be a vehicle component, in which case the fiber composite component may be an interior component or exterior component. On account of flexibility with regard to the choice of fiber reinforcement and of matrix material, it is possible by embodiments of the invention to equip even fiber composite components on which high demands are made with regard to strength with a lighting function. In one configuration, the fiber composite component may therefore be a structural component of a vehicle body, for example a vehicle roof.

Further advantages, features and details of the invention will be apparent from the description that follows, in which working examples of the invention are described specifically with reference to the drawings. It is possible here that the features mentioned in the claims and in the description are essential to the invention, each individually or in any combination. Where the word "can" is used in this application, this means both the technical possibility and actual technical implementation.

Working examples are elucidated hereinafter with reference to the appended drawings.

DETAILED DESCRIPTION OF THE DRAWINGS

Figure 1:
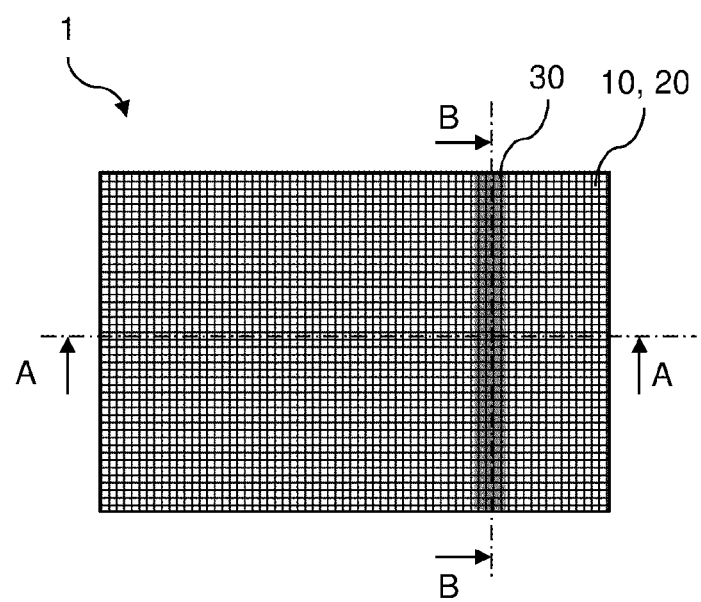
FIG. 1 shows an illustrative fiber composite component in a top view.

FIG. 1 shows an illustrative fiber composite component 1 in the form of a vehicle roof. The fiber composite component 1 has a fiber reinforcement 10 embedded into a polymer matrix 20. In addition, an electroluminescent lamp 30 is disposed between the fiber layers of the fiber reinforcement 10 and embedded into the polymer matrix 20.

Figure 2:
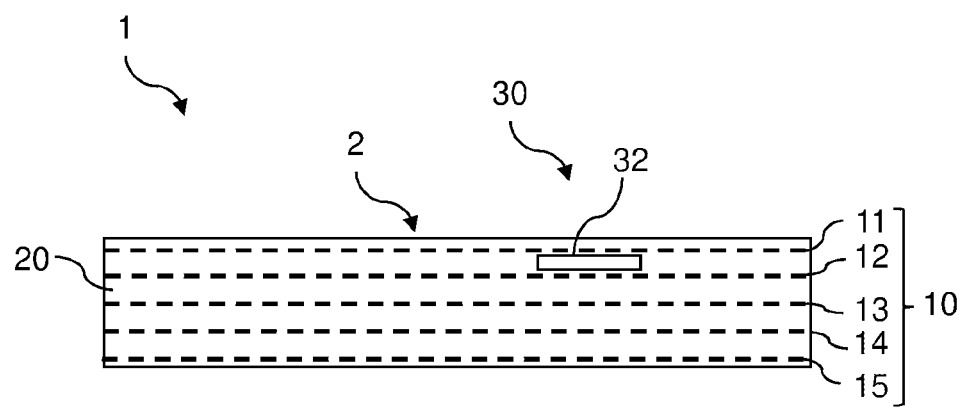
FIG. 2 shows a section view A-A of the fiber composite component from FIG. 1.

FIG. 2 shows a section view A-A of the fiber composite component 1 for illustration of the construction. The fiber reinforcement 10 has multiple (five here by way of example) fiber layers 11 to 15 that are stacked one on top of another to form a stack. The electroluminescent lamp 30 has a lighting element 32 disposed in the stack. Viewed from the visible side 2 of the fiber composite component 1, the lighting element 32 is covered by exactly one fiber layer 11. The electroluminescent lamp 30 and fiber layers 11 to 15 are collectively embedded in the matrix material 20. The matrix material 20 is preferably a thermoset matrix material and especially a transparently curing matrix material.

Figure 5:
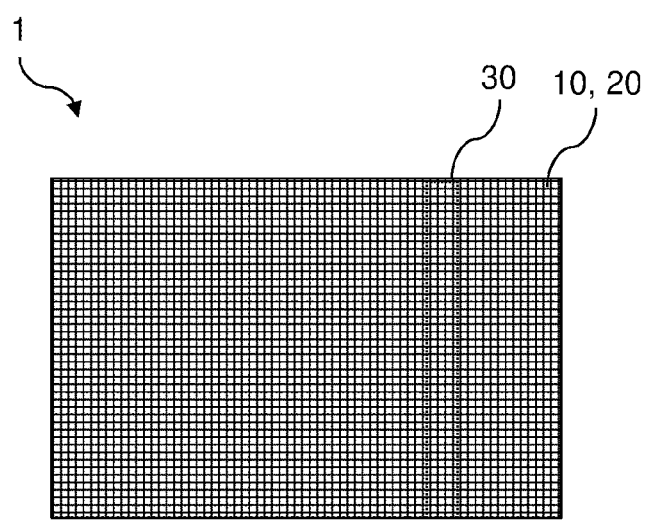
FIG. 5 shows the fiber composite component from FIG. 1 with the illumination switched off.

FIG. 1 shows the fiber composite component 1 with the light function switched on. The electroluminescent lamp 30 shines beneath the fiber layer 11. The light exits from the fiber composite component through the fiber interstices in the direction of the visible side 2. If one or more fiber layers are formed by metallized glass fibers, the light passes through these fibers as well. FIG. 5 shows the same fiber composite component 1 in the unlit state. The electroluminescent lamp 30 is covered by the fiber layer 11 and is integrated virtually invisibly into the component.

Figure 3:
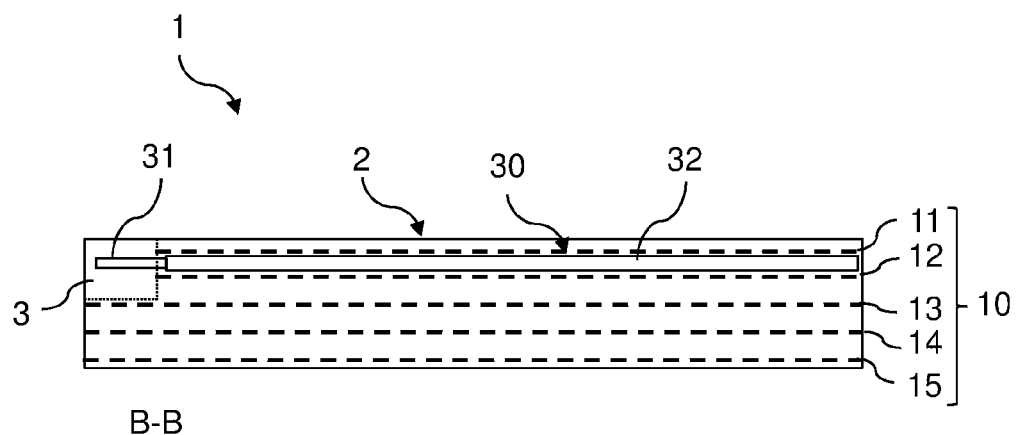
FIG. 3 shows a section view B-B of the fiber composite component from FIG. 1.

The electroluminescent lamp 30 has a contacting section 31 at which the lamp can be connected to an electrical field. The contacting section 31 is preferably, as shown in the B-B section in FIG. 3, disposed in the edge region of the fiber composite component 1. The component section 3 of the fiber composite component that surrounds the contacting section 31 (indicated by the dotted lines in FIG. 3) is formed without reinforcement fibers, e.g. as what is called a pure resin region, which achieves electrical insulation of the contacting section 31 in a particularly simple manner. The contacting section 31 can be exposed by mechanical processing, for example after the production of the fiber composite component 1.

Figure 4:
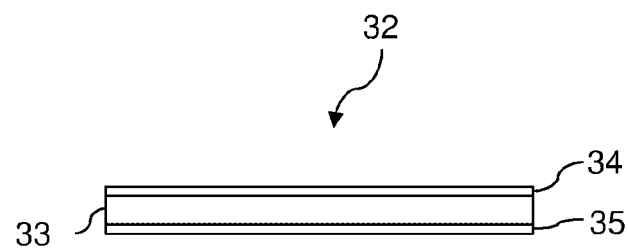
FIG. 4 shows a section view of an illustrative electroluminescent lamp.

The electroluminescent lamp 30 has a lighting element 32 by which the light is generated. The lighting element preferably includes an EL film 33, which is notable for a particularly flat design and has a low space requirement. Such an EL film may typically include an electrically conductive film, which is also referred to as front electrode, a back electrode, and an electrically insulating electroluminescent material disposed in between. The light generated by electroluminescence exits from the lamp through the front electrode. In order to enable simple integration of the electroluminescent lamp 30 into the fiber reinforcement 10, the EL film 33 is provided with an insulation layer on either side; see FIG. 4. On the side facing the visible side 2, a first insulation layer 34 is provided, which is preferably formed by an at least partly translucent color layer, for example a paint layer or colored polymer coating. As well as electrical insulation, this color layer additionally enables a change in the color effect of the light emitted by the electroluminescent lamp 30 or configuration of different colors with just one lighting element, or the color layer can serve as mask to create inscriptions or the like. On the side remote from the visible side 2, a second insulation layer 35 is provided, which is preferably formed by an electrically insulating polymer film.

LIST OF REFERENCE NUMERALS 1 fiber composite component
2 visible side
3 component section
10 fiber reinforcement
11-15 fiber layers
20 polymer matrix
30 electroluminescent lamp
31 contacting section
32 lighting element
33 EL film
34 first insulation layer
35 second insulation layer

The invention claimed is:

1. A fiber composite component with a lighting function, the fiber composite component comprising:
   a fiber reinforcement comprising at least two fiber layers incorporated into a polymer matrix, and
   an electroluminescent lamp having a lighting element disposed between two adjacent fiber layers, wherein:
   the lighting element has a first insulation layer and a second insulation layer that electrically isolate the lighting element from the two adjacent fiber layers.

2. The fiber composite component according to claim 1, wherein:
   the first insulation layer is directed to a visible side of the fiber composite component and takes a form of a color layer.

3. The fiber composite component according to claim 2, wherein:
   the second insulation layer faces away from the visible side of the fiber composite component and is formed by a polymer film.

4. The fiber composite component according to claim 3, wherein the second insulation layer is formed by a PES film bonded to the lighting element by an acrylic adhesive.

5. The fiber composite component according to claim 1, wherein:
   the electroluminescent lamp has a contacting section disposed in an edge region of the fiber composite component.

6. The fiber composite component according to claim 5, wherein:
   a component section of the fiber composite component that surrounds the contacting section is free of reinforcement fibers.

7. The fiber composite component according to claim 1, wherein:
   the lighting element, viewed from a visible side of the fiber composite component, is covered by the polymer matrix and exactly one fiber layer.

8. The fiber composite component according to claim 1, wherein:
   a visible layer of the fiber reinforcement is formed from directed continuous fibers.

9. The fiber composite component according to claim 1, wherein:
   a visible layer of the fiber reinforcement is formed from at least one of carbon fibers, metallized glass fibers or metal fibers.

10. The fiber composite component according to claim 1, wherein:
    the polymer matrix is at least partly transparent.

11. The fiber composite component according to claim 1, wherein:
    the polymer matrix is a thermoset polymer matrix.

12. The fiber composite component according to claim 1, wherein:
    the fiber composite component is an exterior or an interior component of a vehicle.

13. The fiber composite component according to claim 1, wherein:
    the fiber composite component is a structural component of a vehicle body.

* * * * *